United States Patent
Fernandez Gomez et al.

(10) Patent No.: US 9,777,451 B2
(45) Date of Patent: Oct. 3, 2017

(54) PROCESS FOR INSTALLING AN OFFSHORE TOWER

(71) Applicants: SEA WIND TOWERS, S.L., Madrid (ES); ESTEYCO S.A.P., Madrid (ES)

(72) Inventors: Miguel Angel Fernandez Gomez, Madrid (ES); Jose Emilio Jimeno Chueca, Madrid (ES)

(73) Assignees: ESTEYCO S.A.P., Madrid (ES); SEA WIND TOWERS, S.L., Madrid (ES)

( * ) Notice: Subject to any disclaimer, the term of this patent is extended or adjusted under 35 U.S.C. 154(b) by 0 days.

(21) Appl. No.: 14/351,679

(22) PCT Filed: Oct. 18, 2012

(86) PCT No.: PCT/EP2012/070707
§ 371 (c)(1),
(2) Date: Apr. 14, 2014

(87) PCT Pub. No.: WO2013/057225
PCT Pub. Date: Apr. 25, 2013

(65) Prior Publication Data
US 2014/0248090 A1    Sep. 4, 2014

(30) Foreign Application Priority Data
Oct. 18, 2011   (ES) .................................. 201131668

(51) Int. Cl.
*E02D 27/52*    (2006.01)
*E02D 27/12*    (2006.01)
(Continued)

(52) U.S. Cl.
CPC .......... *E02B 17/025* (2013.01); *E02B 17/027* (2013.01); *E02B 17/08* (2013.01);
(Continued)

(58) Field of Classification Search
CPC ........... E02D 27/52; E02D 27/12; E02D 5/40; E02B 2017/0091; E02B 2017/0039; Y02E 10/727; F03D 11/045; F03D 1/001
(Continued)

(56) References Cited

U.S. PATENT DOCUMENTS 2,927,435 A * 3/1960 Upson ..................... E02B 17/00
405/227
2,933,898 A * 4/1960 Upson ................. E02B 17/0008
405/195.1
(Continued)

FOREIGN PATENT DOCUMENTS

EP              2302137 A1    3/2011
WO          0134977 A1    5/2001
(Continued)

*Primary Examiner* — Benjamin Fiorello
*Assistant Examiner* — Edwin Toledo-Duran
(74) *Attorney, Agent, or Firm* — Cowan, Liebowitz & Latman, P.C.; Mark Montague

(57) ABSTRACT

Process for installing an offshore tower, comprising:
a) manufacturing a foundation comprising a block, manufacturing at least one superposition section of a shaft, and manufacturing a base section of a shaft;
b) applying said base section to said foundation block (starting unit) to assume the relative position for the installed condition, applying said superposition sections to said starting unit in a multi-layered configuration, and applying lifting means to at least one of said foundation block and said base section;
c) moving said starting unit up to the installation point;
d) introducing ballast in said foundation block so that said starting unit sinks until resting on the bottom of the body of water;
e) actuating said lifting means to expand said sections into the installed condition;
(Continued)

f) between step a) and c), placing said foundation block or starting unit in the body of water of the installation point.

10 Claims, 18 Drawing Sheets

(51) Int. Cl.
  *E02D 5/40* (2006.01)
  *E02B 17/02* (2006.01)
  *E02B 17/08* (2006.01)
  *F03D 13/25* (2016.01)
  *F03D 13/10* (2016.01)
  *E02B 17/00* (2006.01)

(52) U.S. Cl.
  CPC ............ *F03D 13/10* (2016.05); *F03D 13/25* (2016.05); *E02B 2017/0039* (2013.01); *E02B 2017/0047* (2013.01); *E02B 2017/0065* (2013.01); *E02B 2017/0082* (2013.01); *E02B 2017/0091* (2013.01); *F05B 2240/95* (2013.01); *Y02E 10/727* (2013.01); *Y02P 70/523* (2015.11)

(58) Field of Classification Search
  USPC .............................. 405/195.1, 224, 227, 231
  See application file for complete search history.

(56) References Cited

U.S. PATENT DOCUMENTS

| | | | | |
|---|---|---|---|---|
| 3,390,531 A * | 7/1968 | Johnston | ............ | E02B 17/0004 175/9 |
| 3,516,259 A * | 6/1970 | Tokola | ................ | E02B 17/0013 405/208 |
| 3,803,855 A * | 4/1974 | Malkiel | .................. | B65D 88/78 114/257 |
| 3,896,628 A * | 7/1975 | Hansen | .................. | E02B 17/027 405/207 |
| 4,547,095 A * | 10/1985 | Macchi | ............... | E02B 17/0004 405/195.1 |
| 4,969,776 A * | 11/1990 | Bunce | ................... | E02B 17/021 405/197 |
| 5,288,174 A * | 2/1994 | Kjersem | ............... | E02B 17/021 405/196 |
| RE35,912 E * | 9/1998 | Gomez de Rosas | ... | E21B 17/01 405/195.1 |
| 5,803,668 A * | 9/1998 | Seki | ...................... | E02B 17/021 405/195.1 |
| 2004/0169376 A1* | 9/2004 | Ruer | ...................... | F03D 13/22 290/55 |
| 2006/0062676 A1* | 3/2006 | Jakubowski | ............ | B63B 35/44 416/244 R |
| 2006/0120809 A1* | 6/2006 | Ingram | ................... | E02D 27/42 405/195.1 |
| 2006/0261597 A1* | 11/2006 | Gehring | ................... | F03D 13/25 290/44 |
| 2008/0028715 A1* | 2/2008 | Foss | ....................... | F03D 13/22 52/651.01 |
| 2009/0072544 A1* | 3/2009 | Pao | ........................ | B63B 21/50 290/55 |
| 2009/0162144 A1* | 6/2009 | Ayre | ....................... | E02B 9/08 405/76 |
| 2011/0037264 A1* | 2/2011 | Roddier | .................. | B63B 35/44 290/44 |
| 2011/0155038 A1* | 6/2011 | Jahnig | ..................... | B63B 1/107 114/264 |
| 2011/0314750 A1* | 12/2011 | Nies | ...................... | E04H 12/342 52/173.1 |
| 2012/0045345 A1* | 2/2012 | Horton, III | ............. | F03D 13/40 416/244 R |

FOREIGN PATENT DOCUMENTS

| | | | | |
|---|---|---|---|---|
| WO | WO 2005028781 A2 * | 3/2005 | ............ | B66C 19/02 |
| WO | 2009130343 A1 | 10/2009 | | |
| WO | 2010026098 A2 | 3/2010 | | |
| WO | 2012038487 A1 | 3/2012 | | |

* cited by examiner

PROCESS FOR INSTALLING AN OFFSHORE TOWER

CROSS REFERENCE TO RELATED APPLICATIONS

This is a U.S. national phase of International Patent Application No. PCT/EP2012/070707, filed on Oct. 18, 2012. Priority under 35 U.S.C.§119(a) and 35 U.S.C.§365(b) is claimed from Spanish Patent Application No. P201131668, filed on Oct. 18, 2011.

FIELD OF THE INVENTION

The present invention relates to a process for installing a tower, for use in a body of water, mainly at sea (therefore normally referred to as "offshore").

In particular, the present invention relates to a process for installing a tower shaft, basically made from (optionally reinforced) concrete, from metal or from a concrete/metal combination, of the semi-submerged (or semi-emerged) type in installed condition, and a corresponding tower foundation basically made from concrete, of the submerged type in installed condition.

This type of assembly is mainly used as a support for wind turbines and in said case is globally referred to as "substructure." Throughout this specification, for the sake of simplicity, the term substructure shall be used to refer to the unit formed by the shaft and foundation, without limiting the scope of the description or claims to the application of the object of the invention to wind turbines.

This invention is particularly applicable both to substructures basically made from concrete in their entirety and to substructures having a foundation basically made from concrete and a shaft mainly made from concrete up to a certain height above the water level and mainly from another material (for example, steel), above said certain height.

Therefore, the main sector of application of the invention is the renewable or green energy industry, particularly wind energy.

BACKGROUND OF THE INVENTION

The growing importance of wind energy in recent years in Spain, Europe and the rest of the world is well known, and forecasts point to sustained growth in the generation of wind energy worldwide. The energy policies of the most advanced and economically powerful countries include an increased presence of wind energy among their objectives.

Within this context, offshore wind farms are starting to appear, thus confirming the forecasts of sharp growth in the application of this technology in forthcoming years. While wind farms built on offshore sites are undoubtedly more expensive, logically depending on the depth of the waters where they are installed, the wind has greater quality, higher speed and less turbulence and, consequently, the number of production hours is higher which, added to the greater air density at water level, generates greater revenues than land-based farms, compensating the cost overrun of the initial investment.

The development and construction of offshore wind farms is frequent and the number of marine wind farms currently under study has grown significantly, particularly in Germany, the British Isles and Scandinavian countries, consistent with the predicted growth of these types of farms, closely linked to the strategic objectives established at state level aimed at reaching certain renewable energy quotas.

The tendency to use higher-powered and larger wind turbines with the objective of reducing the unit cost of installed power has been ever-present in wind turbine development and is, if possible, even more accentuated in the case of offshore wind energy. Practically all large wind turbine manufacturers have high-power models, three-megawatt or more, under study or in advanced stage of development, adapted to sea conditions, which are particularly demanding. This, in turn, represents a significant increase in substructure-related specifications and requirements—foundation and shaft—imposed on the wind turbines which, added to their use in increasingly deep sites, will require the development of novel concepts for said substructure, with increased capacity and competitive cost.

The solutions generally envisaged in the current state of the art for the construction of offshore farms are listed and described below in an orientative and non-limiting manner.

Shallow water depths:

Driven metal monopile not connected to the tubular metal tower shaft itself.

Gravity-based foundations: structural concrete footing, often with pedestals. These are transported and anchored using barges and/or sea cranes.

Suction bucket: based on driving watertight buckets into the seabed and consequently leveraging the differences in pressure generated.

Medium and deep water depths:

Tripod: The metal tower is supported by a structure having three tilted legs that rest on the seabed by means of driven piles or other similar system. The tower may be centered in relation to the tripod legs or arranged on one of said legs.

Tripile: The metal tower rests, by means of a cross-shaped transition part having three arms, on three vertical piles submerged and driven into the seabed.

Jacket: The metal tower is supported by a jacket structure having four legs or columns.

In the case of ultra-deep water depths, floating solutions anchored to the seabed have been envisaged.

An overview of the state of the art results in the following general considerations:

All solutions are based on shafts in the case of metal tubular-type towers.

Solutions for medium and deep water depths include a change in tower shaft typology, with a metal tubular tower for the emerged part and a highly differentiated element for the submerged part (tripod, jacket, etc.).

Concrete gravity-based foundations are envisaged for shallow depths, such as semi-submerged structures, and include installation by means of sea cranes.

Among the main drawbacks and limitations of the known solutions envisaged for the substructure of an offshore wind turbine, the following must be highlighted:

High costs deriving from the scarce and expensive means for transporting, handling and lifting the foundation, tower and turbine elements at sea.

Low durability of steel in marine environments due to the aggressive environmental conditions (high humidity/salinity), particularly in tidal zones, entailing high and expensive maintenance requirements. This, added to the high sensitivity of metal structures to fatigue loads, limits the useful life of the metal components of the substructure.

Highly sensitive to collisions with sea vessels, icebergs and drifting objects in general.

Highly dependent on complex and uncertain geotechnics in the different cases of gravity-based foundations.

In cases of ultra-deep water depths: complex, delicate and expensive transition zones between the emerged tubular shaft of the tower and the different types of partially submerged elements connected to the foundations at seabed level.

High environmental impact of driven pile solutions due to the noise and vibrations generated by these during execution thereof.

Uncertainties deriving from variability in steel pricing, notably more accentuated than that of concrete.

High sensitivity to critical connection details with foundations by means of driven piles, which must support the low redesign accuracy of driven solutions and have been a source of significant pathologies in current farms.

Metal tubular towers are based on factory-made, closed-circumference tube parts which limits maximum diameters if road transport is required. This limits tower capacity and height. If larger diameters than those transportable by road are sought by manufacturing the towers in shipyards or coastal facilities, this will considerably limit the potential industries and factories for manufacturing these towers.

Solutions involving limited tower shaft rigidity, which limits capacity for greater tower heights and wind generator sizes, particularly with low-rigidity foundation solutions, which is the most frequent case in offshore installations.

Expensive elements for the submerged part of the installation, increasing exponentially with depth.

High dependence on specific means for lifting and transport in marine environments, which are very costly and hardly available.

SUMMARY OF THE INVENTION

The present invention aims to resolve or mitigate the drawbacks and limitations of the prior art.

Structural concrete has been proven to be a suitable material for offshore constructions, particularly marine constructions.

Thereby, the present invention promotes the use of structural concrete for the tower as a technically and economically advantageous material in different aspects, particularly for applications in the demanding and aggressive marine environment. Although metal structures are mainly used in mobile floating elements, as an extension of naval practices and always associated with uninterrupted maintenance, concrete is in turn an advantageous alternative and therefore more frequent in all kinds of permanent-type marine constructions (ports, docks, wharves, breakwaters, rigs, lighthouses, etc.).

This is basically due to the structural durability, robustness and resistance to the low sensitivity to marine corrosion and to the practically maintenance-free service life of structural concrete. Adequately designed, its useful life normally exceeds fifty years.

Additionally, concrete offers advantages due to its tolerance to impacts or collisions and can be designed, for example, to support the forces generated by drifting ice or the impact of small ships, as well as the ease and economy of eventual repair thereof.

Structural concrete is also a universal construction material and the raw materials and means for manufacturing it are readily available worldwide and relatively inexpensive.

It is therefore known and accepted that concrete is an especially adequate material for marine construction and the present invention promotes use thereof, allowing leveraging of its qualities for the particular restraints and circumstances of offshore wind farms, as opposed to current practices for the construction of these types of facilities, which are mostly based on the use of steel.

Specifically, the present invention relates to a process for installing a substructure which includes: a tower shaft basically made from (optionally reinforced) concrete, metal or a concrete/metal combination, of the semi-submerged type in installed condition, and a corresponding tower foundation made from concrete, of the submerged type in installed condition.

Said shaft is formed of at least two tubular sections preferably basically made from concrete, in most cases tapered upwards in installed condition, which are placed one on top of the other coaxially, with either a rim-against-rim or overlapping connection, until completing the envisaged height. Therefore, there are respective horizontal joints between the successive sections. One section of the shaft is intended to be arranged in installed condition directly over said foundation and shall hereinafter be referred to as the "base section" (any section apart from the base section shall hereinafter be referred to as the "superposition section"). One of the superposition sections is a top section, intended to be located in the highest position in the shaft in installed condition.

Each of said sections can be made from a single piece (hereinafter referred to as "integral section"). Alternatively, at least one of said sections can be formed of at least two circular arc parts (or voussoirs), arranged side-by-side until completing the envisaged circumference of the corresponding section. Therefore, there are respective vertical joints between successive voussoirs.

Furthermore, a configuration where a plurality of sections are essentially arranged on the same level and coaxially to one another is hereinafter referred to as "multi-layered configuration".

The installation process according to the present invention comprises the following steps, in chronological order:

a) dry manufacturing a foundation comprising a block basically made from concrete, said foundation block being essentially hollow and watertight and having first ballast valve means for opening a passage to the interior of said foundation block, dry manufacturing at least one superposition section of a shaft, and dry manufacturing a base section of a shaft;

b) applying, mechanically or integrally, said base section to said foundation block in such a manner that said base section and said foundation block assume the relative position envisaged for the installed condition, said base section and said foundation block forming a unit hereinafter referred to as "starting unit", applying said superposition sections to said starting unit so that said base section and said superposition sections are in a multi-layered configuration, and applying external lifting means for mounting towers and/or self-lifting means to said foundation block and/or said base section;

c) moving said starting unit, in a self-floating manner, through the body of water wherein the installation point of said substructure is located, up to the installation point of said substructure;

d) actuating, in a controlled manner, said first ballast valve means of said foundation block so as to open a passage to the interior of said foundation block and introduce ballast in said foundation block through said passage in such a manner that said starting unit sinks until resting on the bottom of the body of water; and e) actuating said external lifting means for mounting towers and/or said self-lifting means in order to expand said sections into the installed condition of the resulting shaft.

It should be understood that, in the event that one of said superposition sections is formed from voussoirs, the dry manufacturing said superposition sections includes the pre-assembly of said voussoirs until forming complete sections.

The installation process according to the present invention also comprises the following step:

after step a) and before step c): f) placing said foundation block or starting unit in the body of water wherein the installation point of said substructure is located.

For example, said foundation block and said base section are dry manufactured using dry docks and sluices, or even floating docks, in order to allow floatation of the foundation block, the top section and the base section from the same point of manufacture thereof, or using ramps, lifting platforms (for example a synchrolift type platform) or any other means known in the art to launch large ships and other marine structures.

The installation process according to the present invention can also comprise the following step:

after step f): g) arranging said foundation block in a position such that said first ballast valve means are submerged at least partially in the body of water where the installation point of said substructure is located.

If the installation process according to the present invention includes step g), the ballast that is introduced in step d) can be water from the body of water where the installation point of said substructure is located.

The installation process according to the present invention can also comprise the following step:

after step a) and before step c): h) laterally applying at least one auxiliary structure having positive floatability to said foundation block and/or to said base section.

If step h) above is implemented, step b) can be replaced by the following step:

b') applying, mechanically or integrally, said base section to said foundation block in such a manner that said base section and said foundation block assume the relative position envisaged for the installed condition, said base section and said foundation block forming a unit hereinafter referred to as "starting unit", applying said superposition sections to said starting unit so that said base section and said superposition sections are in a multi-layered configuration, and applying external lifting means for mounting towers and/or self-lifting means to said foundation block and/or said base section and/or to said at least one auxiliary structure.

The installation process according to the present invention can also comprise the following step:

after step a) and before step c): i) applying wind turbine means to said foundation block and/or to said base section and/or to said superposition sections and/or, if step h) above is implemented, to said auxiliary structure.

Throughout this specification, the term "wind turbine means" is intended to mean the whole or any portion of a unit for transformation of wind power into electrical power, comprising nacelle, generator, blades and functional fittings.

In step i), said wind turbine means can be applied in a temporary position, i.e. in a position different to the position they occupy in installed condition, in which case the installation process according to the present invention also comprises the following step:

after step i): j) arranging said wind turbine means on the top section.

In the alternative, said wind turbine means, possibly including even the blades, can be applied in step i) directly on the superposition section intended to be the top section.

In the installation process according to the present invention, said foundation block is configured in such a manner as to have the floatability required for step c). Additionally or alternatively, said starting unit is configured in such a manner as to have the floatability required for step c).

Optionally, said foundation block is multicellular (i.e. it is internally divided into watertight enclosures by means of partition walls). In this case, at least one of said partition walls can include first distribution valve means for fluid communication between adjacent watertight enclosures, in which case said first distribution valve means can be actuated in such a manner as to cause spatially selective ballasting of said foundation block, in order to aid the orientation of said starting unit during transport or sinking or anchoring.

Additionally, said foundation block can be platform-shaped, preferably with a box-shaped configuration with a polygonal (e.g. quadrangular or octagonal) or circular base.

Said ballast valve means and said distribution valve means can include remote actuation means and/or predetermined automated actuation means.

Said ballast valve means and said distribution valve means can be actuated in a controlled manner before step d), in such a manner as to partially ballast said starting unit in order to position and/or give greater stability to said starting unit at any time prior to sinking and anchoring thereof.

Instead of or in addition to said ballast valve means, the present invention provides for said foundation block to include other devices known in the art to ballast the starting unit with water or any other material, such as for example pumping means, either located onboard of vessels in the vicinity of said starting unit or applied to said starting unit and/or said auxiliary structure, so as to pump ballast material, preferably water, into said starting unit.

It must be pointed out that, by means of a special type of tower intended for enabling high-capacity wind turbine support tower solutions, the present invention provides a repowerable substructure. That is, a substructure originally designed with increased capacity and adaptability for allowing repowering (the future substitution of an original wind turbine for another with greater output power, efficiency and profitability) leveraging the same substructure. A repowerable substructure such as that proposed and enabled by the present invention gains in meaning and interest to offshore installations for several reasons, among which the following must be highlighted:

In the case of offshore farms, the fraction of investment destined to the infrastructure and civil works increases qualitatively, due to which the search for concepts which, based on future repowering, extend the useful life thereof and facilitate amortisation gains in meaning. The same applies to the amortisation of the decommissioning costs of the entire substructure upon concluding its useful life.

At present and, in general, substitution of the wind turbine for onshore repowering also implies substitution of the entire substructure which, on being a smaller fraction of the total cost, has a limited influence on the profitability of said repowering; in the case of offshore, in turn, the investment destined to the substructure represents a much larger fraction of the total and the complete substitution would significantly penalise the profitability of a possible repowering.

Wind turbines having greater output power and rotor diameter require a larger distance between positions in order to prevent the presence of the turbine from affecting wind conditions in neighbouring turbines. Initially planning repowering of the substructure itself would therefore imply initially envisaging certain inter-distances between wind turbines larger than those strictly necessary in a first phase. This represents a drawback in onshore farms due to the greater occupation of land which, however, decreases significantly in the case of offshore farms.

In onshore farms, the substructure loads and requirements that govern its design and cost are nearly exclusively due to the wind turbine. In offshore towers, in turn, a very large part of the tower and foundation requirements are due to the action of the waves and currents which are independent of the wind turbine. Consequently, an increase in the size of the wind turbine implies a relative increase in total substructure loads far below the equivalent in the case of onshore farms, particularly in the case of ultra-deep sites. This significantly limits the initial overrun cost of preparing the substructure of an offshore turbine so that it can support larger turbines in the future.

In offshore farms, wind shear is much less, which significantly reduces the necessary height of the tower (above sea level) for a certain rotor diameter. This facilitates the possibility of maintaining the same tower for a future wind turbine having greater output power and rotor diameter.

A repowerable substructure allows full leveraging of the improved durability of concrete structures in marine environments, as well as their lower fatigue sensitivity, thereby preventing their useful life from being unnecessarily limited by the less durable elements, which are the wind turbine and its different components.

Wind turbines built for offshore application are considerably more expensive, regardless of their substructure, due to the much more stringent requirements in terms of durability in marine environments throughout their useful life, generally established at twenty years. Initially envisaging shorter-term repowering can allow a reduction in requirements in this regard for the first wind turbine, which could be designed for a shorter useful life, with the ensuing reduction in cost.

In general, and finally, experience in the development and evolution of wind turbine technology has shown that the period of practical obsolescence of turbine energy generation capacity in relation to the latest developments and the state of the art can be much shorter than the useful life of the generator itself, generally established at twenty years. Predicting a similar trend in the emerging offshore wind energy sector, and therefore that profitability can be improved by incorporating more efficient future technology (repowering) in a period of less than twenty years makes technological and economic sense.

BRIEF DESCRIPTION OF THE DRAWINGS

These and further characteristics and advantages of the invention will become evident from the following description of an embodiment of the invention, provided solely by way of non-limiting example, with reference to the accompanying drawings, wherein.

DETAILED DESCRIPTION OF THE INVENTION

Figure 1:
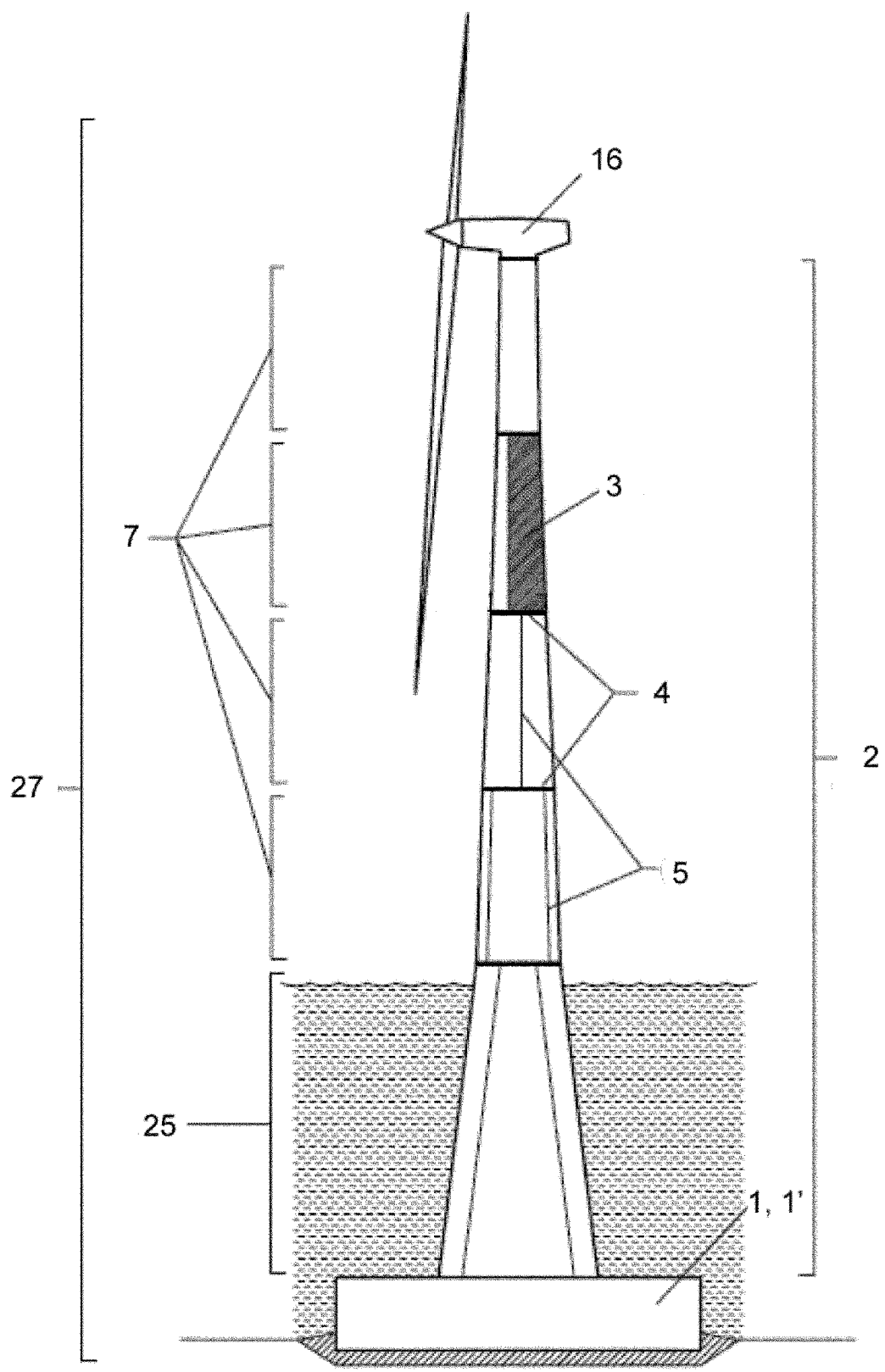
FIG. 1 shows a schematic front view of an embodiment of an offshore tower which can be assembled following the installation process according to the present invention.

Initially referring to FIG. 1, an embodiment of an offshore wind tower 27 is shown, that is, a substructure 1, 1', 2 for supporting wind turbine means 16, susceptible of being installed by means of the installation process according to the present invention.

Said tower 27 is formed by a foundation block, specifically a submerged platform 1, 1' having gravity-based foundations, basically made from structural concrete, full of ballast, and a shaft 2, of the semi-submerged type, which in turn includes a plurality of sections 25, 7 mainly formed by concrete voussoirs 3, also including horizontal joints 4 and vertical joints 5 between said sections 25, 7 and said voussoirs 3, respectively. Said substructure 1, 1', 2 supports wind turbine means 16. For certain applications, said substructure can comprise only the platform 1, 1' and base section 25, arranging said wind turbine means 16 directly on said base section 25.

Said platform 1, 1' is dry manufactured (on land, dry docks, coastal or floating ports, or other enabled and protected coastal or maritime facilities) and configured following the installation process of the present invention in such a manner that, during installation phases prior to shaft 2 assembly, said platform 1, 1', without ballast, provides a provisional and stable floating platform which enables transport by self-floatation with the corresponding base section 25 applied thereto (said foundation platform and said base section thus forming a starting unit 1, 1', 25), to its final site.

Therefore, according to the installation process according to the present invention, the voussoirs 3 that form at least some sections 25, 7 of the shaft 2 are assembled prior to transport thereof in open sea, in such a manner as to transport sections 25, 7 already pre-assembled and complete.

The final assembly of the shaft 2 by successive stacking of the superposition sections 7 is generally carried out at the final site.

Platform 1, 1' is substantially flat and horizontal at the bottom and built of structural concrete, whether using in-situ concrete techniques or by assembling prefabricated parts or panels, or a combination of both. The plan and elevation geometry thereof may vary in accordance with specific project requirements, adopting for example significantly circumferential 1 floor plan configurations, whether with a curved or polygonal perimeter, or quadrangular 1' type configurations aimed at simplifying construction thereof, as well as other regular or irregular polygon shapes, with straight or curved sides. The dimensions of the platform 1, 1' are predetermined in accordance with known techniques in such a manner that:

- wind tower 27 stability in installed condition is provided, thanks to its own weight and that of the ballast, and to adequate load transfer on the seabed,
- a platform 1, 1' is provided, having the floatability and stability required for said previous function as a provisional floating and stable platform,
- a starting unit 1, 1', 25 is provided, having the necessary space and resistance to transport superposition sections 7 or other necessary components and equipment.

The flat morphology and large volume of the foundation platform 1, 1' allow limitation of the necessary water depths for floatation thereof, thereby reducing the operating requirements for the infrastructures that serve for manufacturing and subsequent floating thereof.

FIGS. 2 to 6 relate to a first example of an offshore tower for the installation process according to the present invention.

Figure 2:
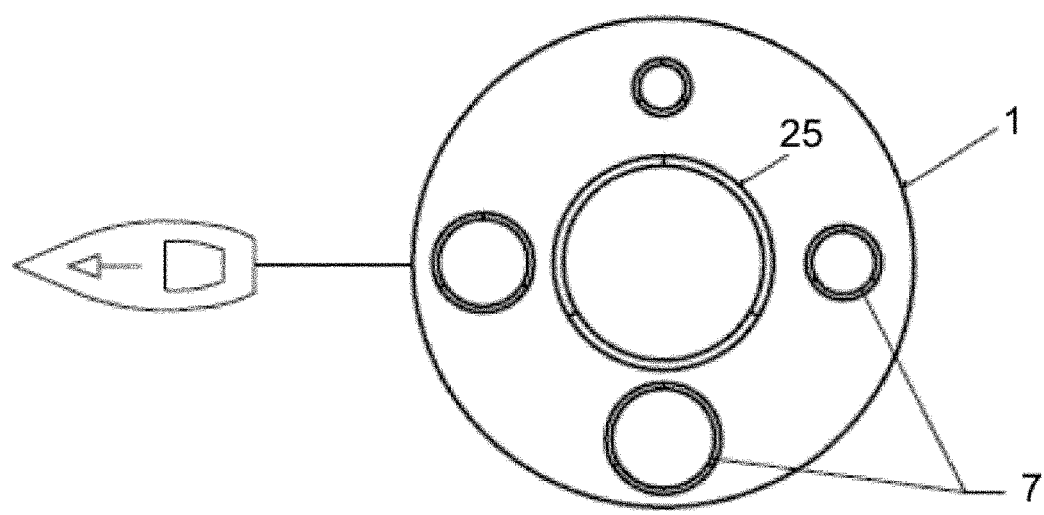
FIG. 2 shows a schematic top plan view of a first starting unit which is being towed with superposition sections thereupon.

Specifically, FIG. 2 shows a starting unit 1, 25 which is being towed in a self-floating manner along the sea surface prior to sinking thereof, with superposition sections 7 arranged thereupon.

Figure 3:
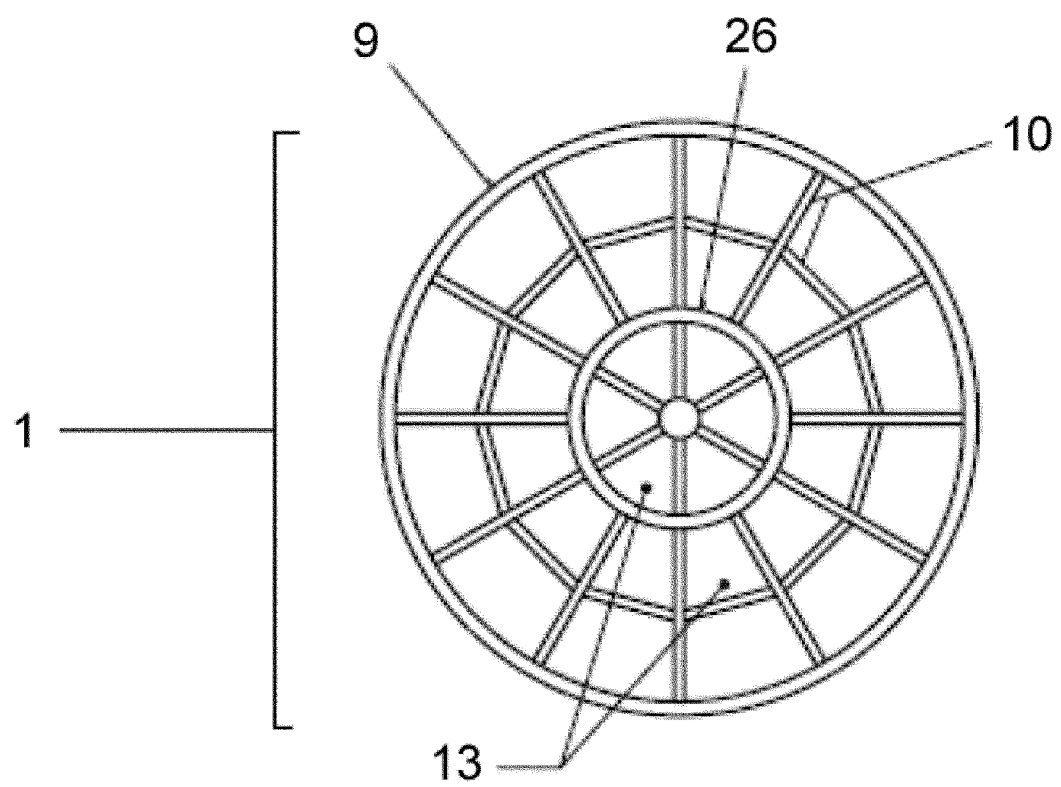
FIG. 3 shows a schematic sectional top plan view of the internal configuration of the foundation block of the starting unit of FIG. 2.
Figure 4:
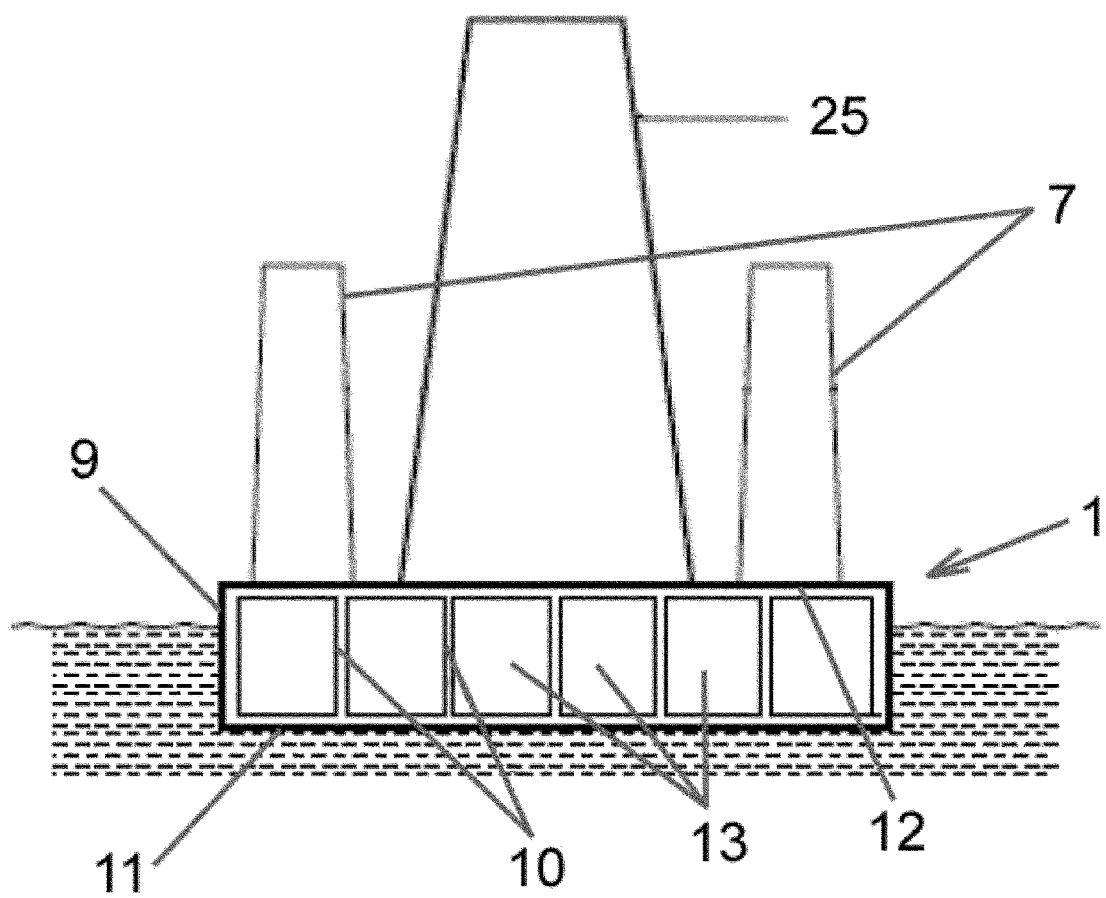
FIG. 4 shows a schematic sectional front view of the starting unit of FIG. 2 with superposition sections thereupon.

FIG. 3 shows the platform 1 of FIG. 1, configured by way of a multicellular circular box, which comprises a lower slab 11, an upper slab 12 and a peripheral slab 9, as well as a plurality of straight, rigid inner ribs 10. The ribs 10 are arranged forming squares which delimit inner enclosures 13. For example, the lower slab 11 and peripheral slab 9 are executed by means of in-situ concrete, and the upper slab 12 and ribs 10 are materialised by means of prefabricated alveolar slabs. The platform 1 comprises a circumferential rib 26 which coincides with the circumferential extension of the base section 25 and is structurally prepared for mechanically connecting to the base section 25 by means of the upper slab 12.

At least one of the lower 11, upper 12 or peripheral 9 slabs has ballast valves, and at least part of said inner enclosures 13 are watertight and/or have distribution valves. These inner enclosures provide an adequate floatation volume for said function as a provisional and stable floating platform; additionally, upon reaching the installation point, controlled filling, totally or partially, with ballast (for example water 17) of all or some of these enclosures 13 by means of said ballast valves and/or said distribution valves helps to carry out the sinking operation of the starting unit, in such a manner as to correctly orient said starting unit.

Remote actuation means and/or predetermined automated actuation means can be incorporated to actuate said ballast valves and/or said distribution valves. There can also be intermediate stable phases during the sinking operation, wherebetween superposition section 7 assembly phases are interspersed. To this end, different floatation configurations can be used, varying the selective filling of the inner enclosures 13. Finally, said inner enclosures can remain filled with ballast 17 in their final situation after installation in order to generate greater stabilising weight.

As shown in FIGS. 2, 4-6 and 17, at least part of the superposition sections 7 can be transported on the starting unit 1, 25, whether in their final position on said starting unit 1, 25 or, as shown, in a provisional position enabled for transporting the superposition sections 7.

Figure 5:
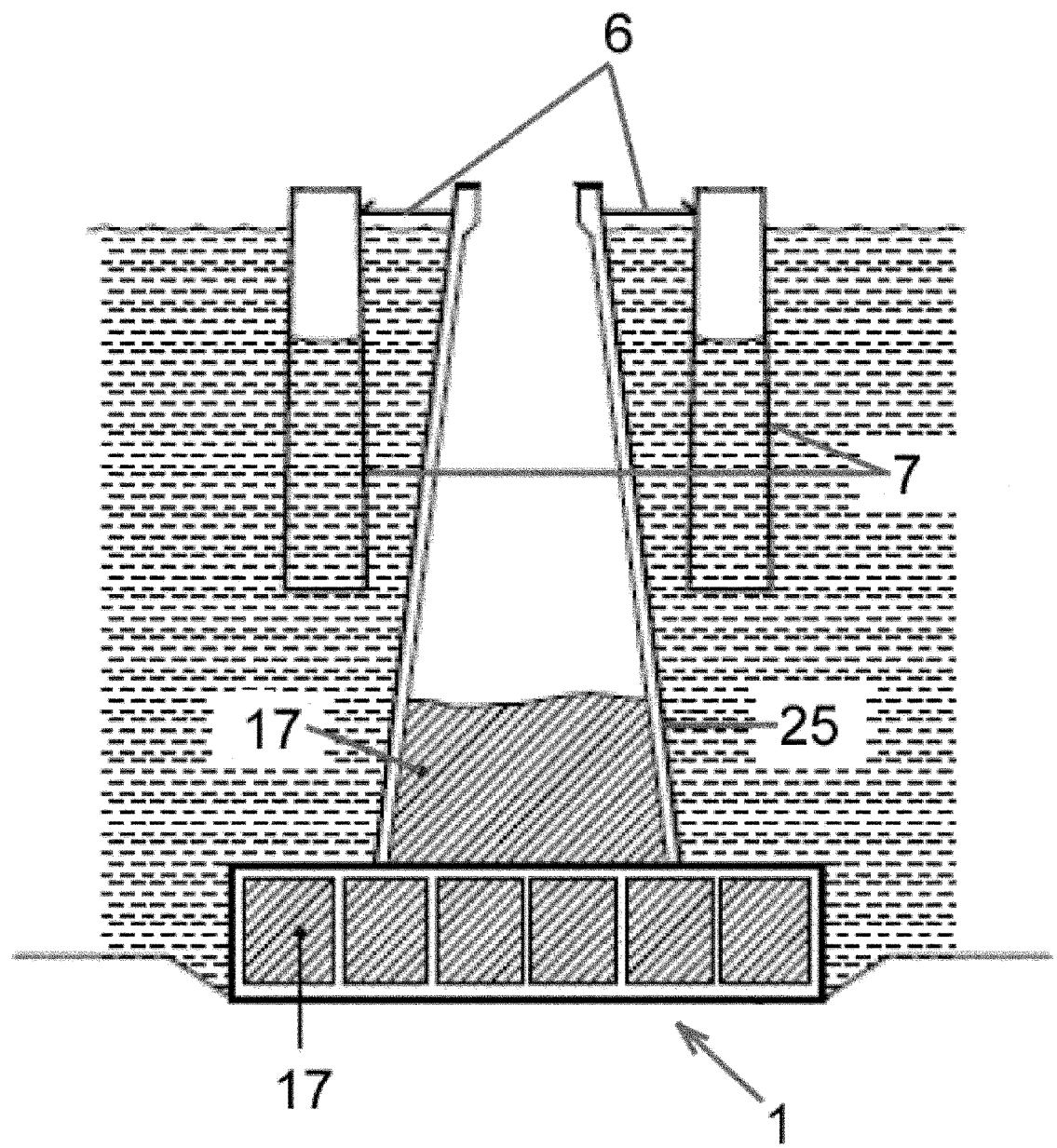
FIG. 5 shows a schematic sectional front view corresponding to FIG. 3 but at a later stage of an installation process according to the present invention.
Figure 6:
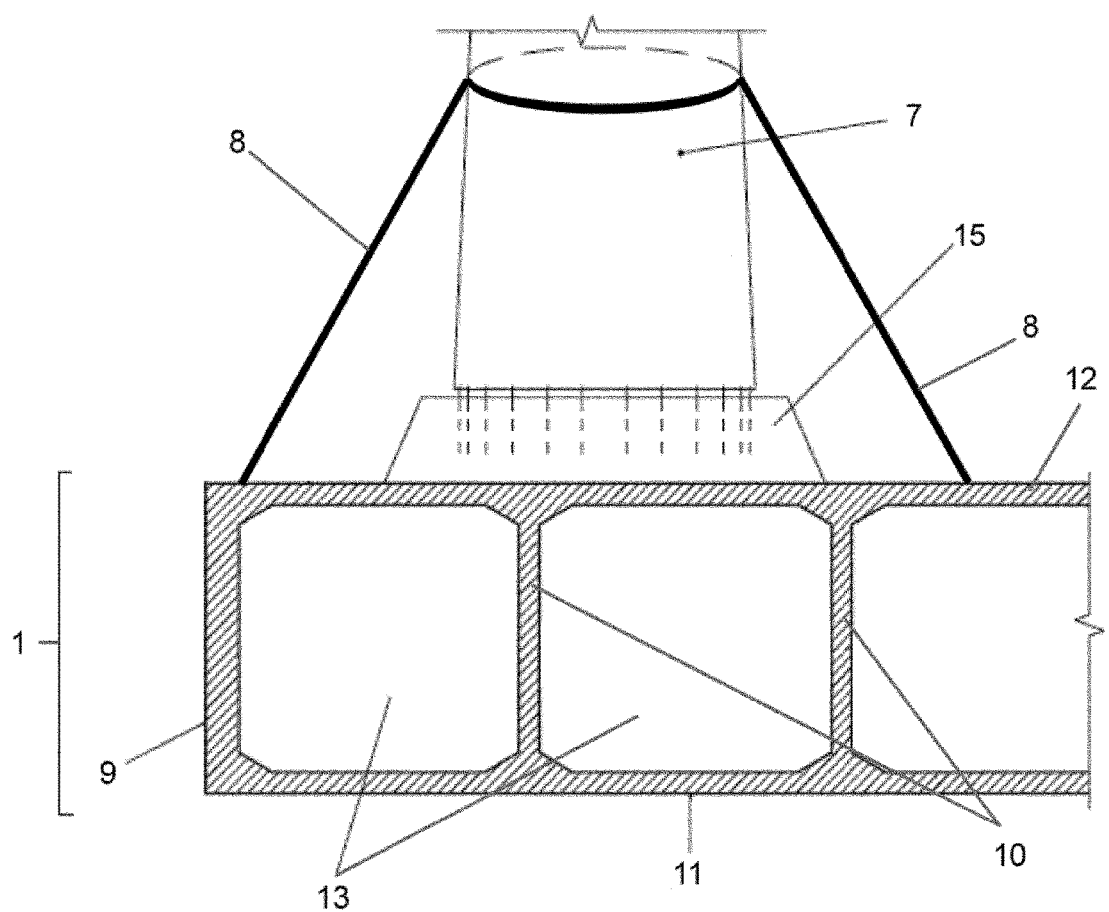
FIG. 6 shows a schematic front view of a detail of the assembly of FIGS. 2 to 5, in partial cross-section.

As shown in FIG. 5, the starting unit 1, 25 can use the internal volume of the platform 1 and also the internal volume of the base section 25 as floatation volume. In fact, the floatation of said internal volume of the base section 25 can complement or substitute the floatation of the platform 1. The platform 1 can be submerged during transport.

FIG. 5 also shows that securing and anti-collision means can be arranged to aid the sinking of said starting unit 1, 25. Said securing and anti-collision means comprise arms 6 joined in a fixed manner to said superposition sections 7 and in a sliding manner to said base section 25, in such a manner that while sinking, the arms 6 move upwards through the base section 25 so as to maintain said superposition 7 sections conveniently secured to the base section 25, thereby preventing the superposition sections 7 (which are floating nearby) from drifting away and becoming dispersed and/or colliding with the starting unit 1, 25.

Fastening means for provisionally securing the superposition sections 7 on said platform 1 may be arranged. As can be particularly seen in FIG. 6, in this embodiment said fastening means comprise tensioning cables 8 which secure the superposition section 7 to the platform 1 and a base 15 whereupon the superposition section 7 rests. Said tensioning cables 8 will be released before arranging said superposition sections 7 on said starting unit 1, 25 in the position envisaged for the installed condition. Preferably, said tensioning cables 8 will be released while sinking the starting unit 1, 25.

In this example of a tower as shown in FIG. 5, said superposition sections 7 are adapted by means of internal partitioning for self-floatation and, optionally, self-overturning, in such a manner that, when not joined to the starting unit 1, 25 (whether due to being superposition sections 7 which have been transported on the starting unit 1, 25, the fastening means of which have become released, or due to being superposition sections 7 which have been transported independently to the starting unit 1, 25) these float and can be oriented.

After anchoring, shown in FIG. 5, the superposition sections 7 will be raised and positioned using external assembly means (conventional and therefore not shown) for executing marine constructions.

FIGS. 7 to 11 relate to a second example of an offshore tower for the process of the present invention.

Specifically, in accordance with the project and stability conditions adopted for the platform 1', as shown in this example, at least two sections 25, 7 can be stacked in their final position on the platform 1' prior to transporting the assembly by floatation. Likewise, auxiliary floating structures 14 can be used, possibly provisional and reusable, which increase platform 1' floatability and stability. These auxiliary floating structures 14 are provisionally attached and connected to said platform 1' using adequate anchoring 21 means. These auxiliary floating structures 14 also serve, in this example, to transport at least part of the superposition sections 7 and wind turbine means 16, with or without blades, thereupon.

Guiding or stabilizing means can also be arranged to aid the sinking of said starting unit 1', 25. As can be particularly seen in FIG. 10, said guiding or stabilizing means comprise articulated bars 18 joined in a fixed manner to said auxiliary floating structures 14 and in a sliding manner to said base section 25. Of course, the guiding or stabilizing means can be present in the form of any kind of device suitable to link the starting unit 1', 25 and said auxiliary floating structures 14, such as articulated bars 18 like in this embodiment, or as steel cables essentially vertical connecting said auxiliary floating structures to the foundation block, or the like.

It should be understood that, although in this embodiment sinking is assisted by said auxiliary floating structures 14, separate auxiliary floating structures specifically provided to this end and linked to said foundation block and/or said base section and/or to said superposition sections prior to step d) can be used.

Figure 7:
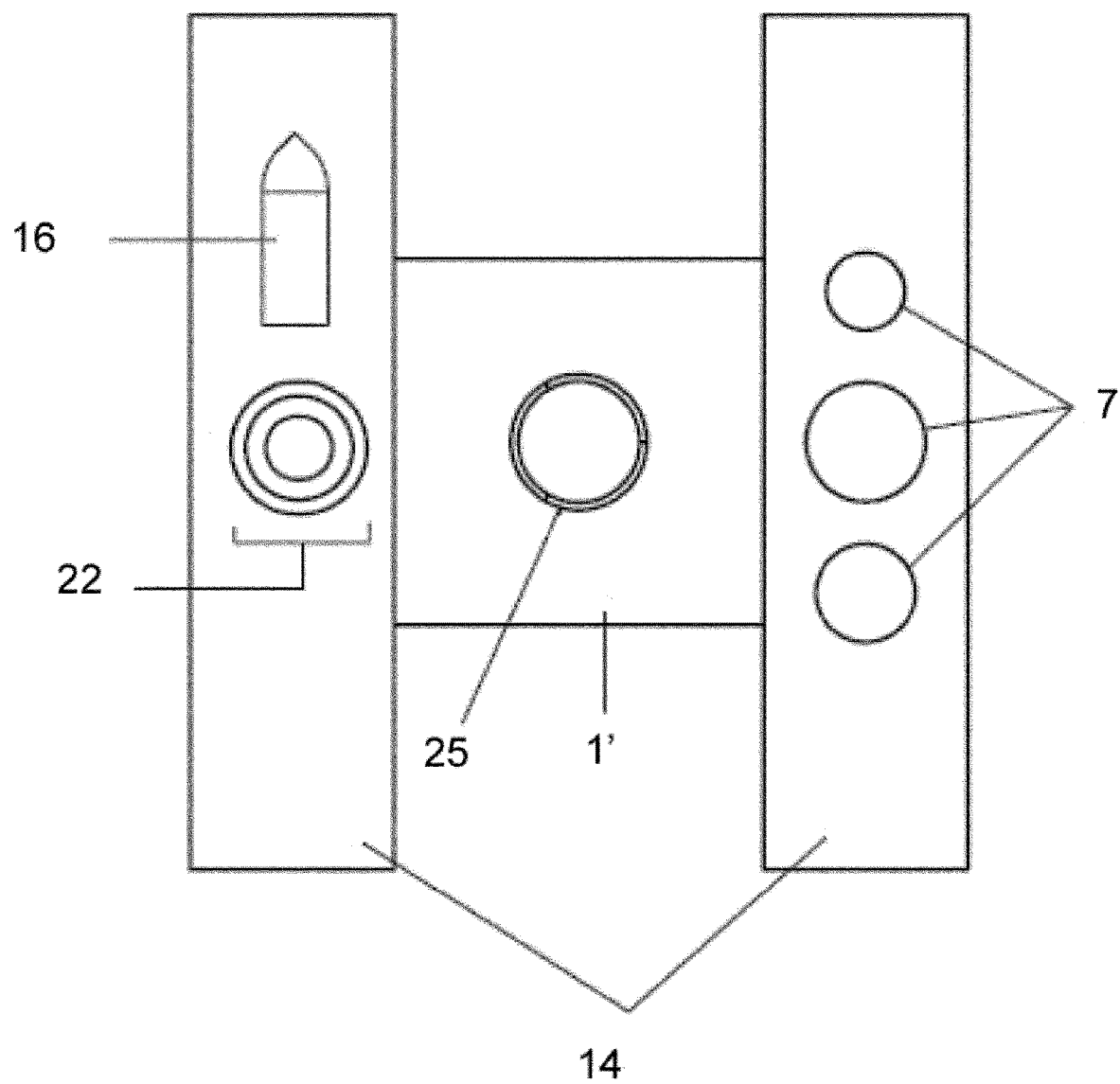
FIG. 7 shows a schematic top plan view of a second starting unit with two auxiliary floatability structures which support superposition sections and wind turbine means.
Figure 8:
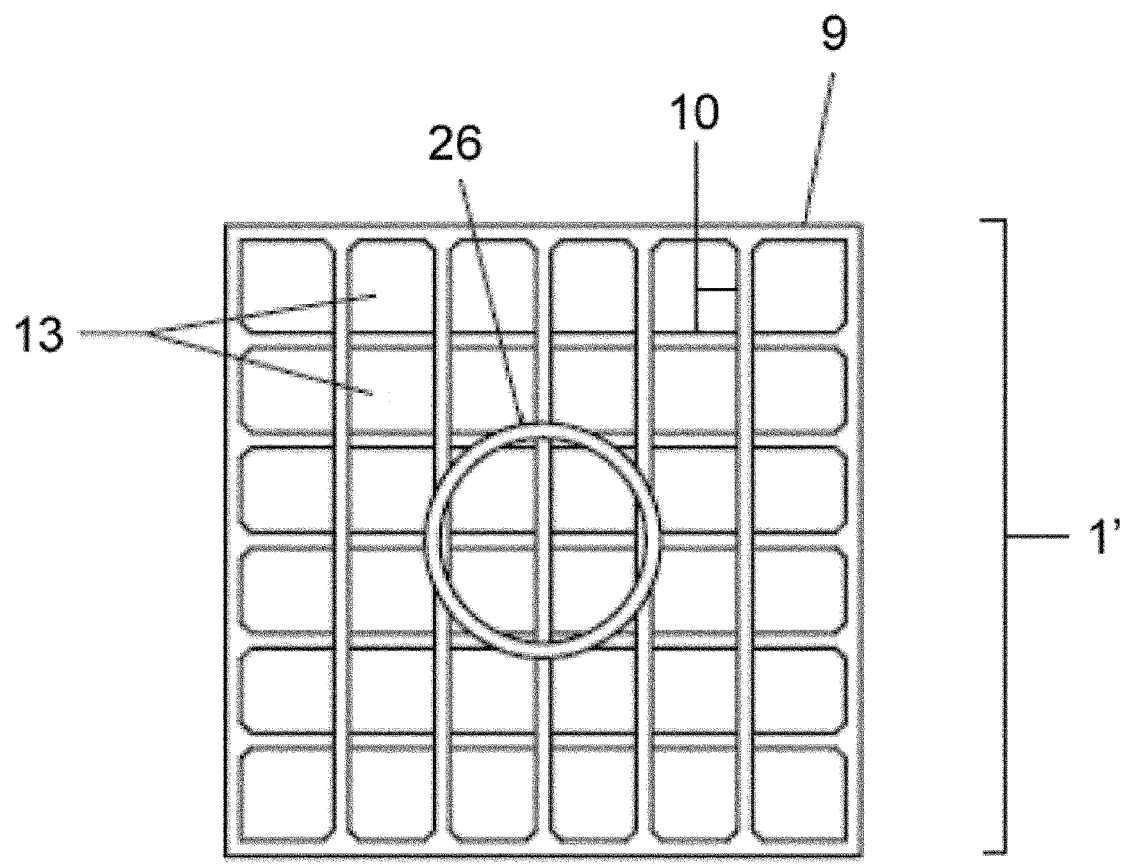
FIG. 8 shows a schematic sectional top plan view of the internal configuration of the foundation block of the starting unit of FIG. 7.
Figure 9:
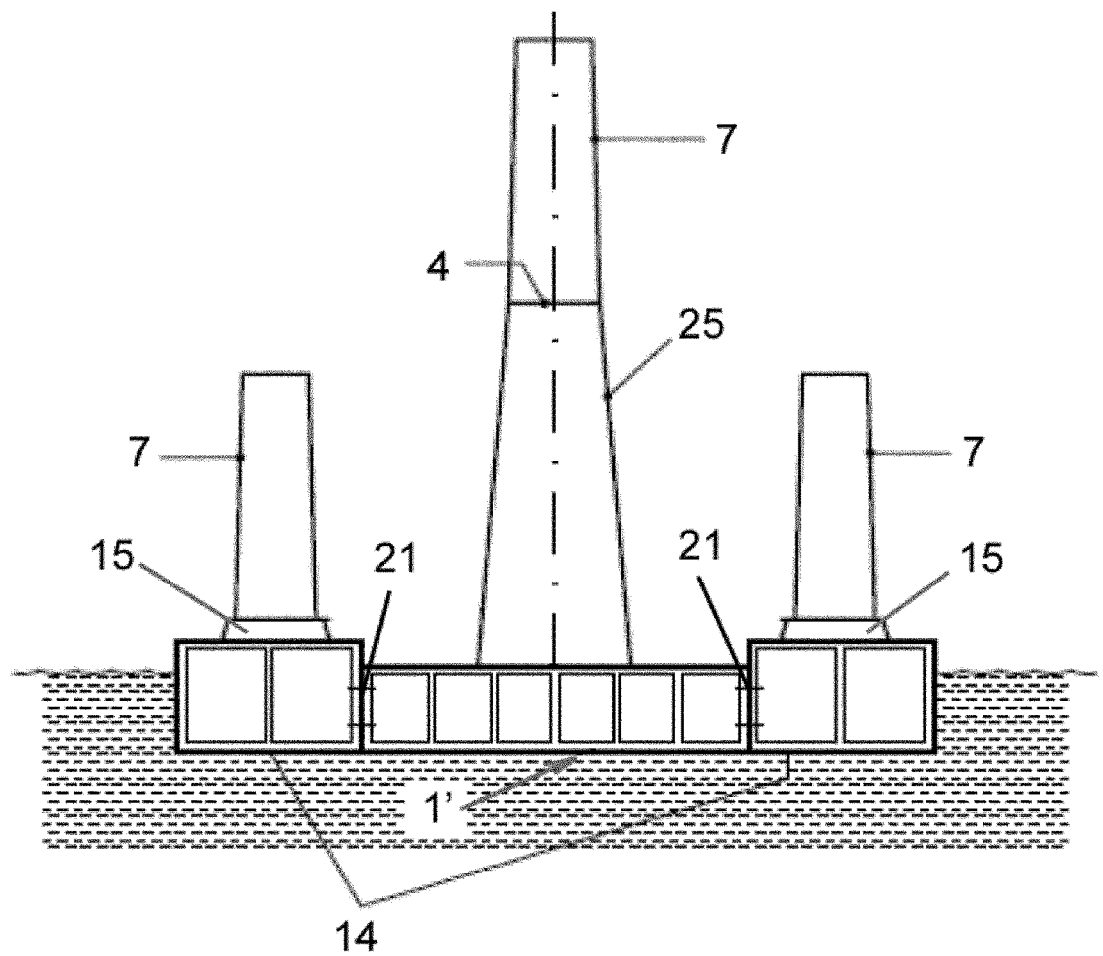
FIG. 9 shows a schematic sectional front view of the starting unit of FIG. 7 with two auxiliary floatability structures which support superposition sections and wind turbine means.
Figure 10:
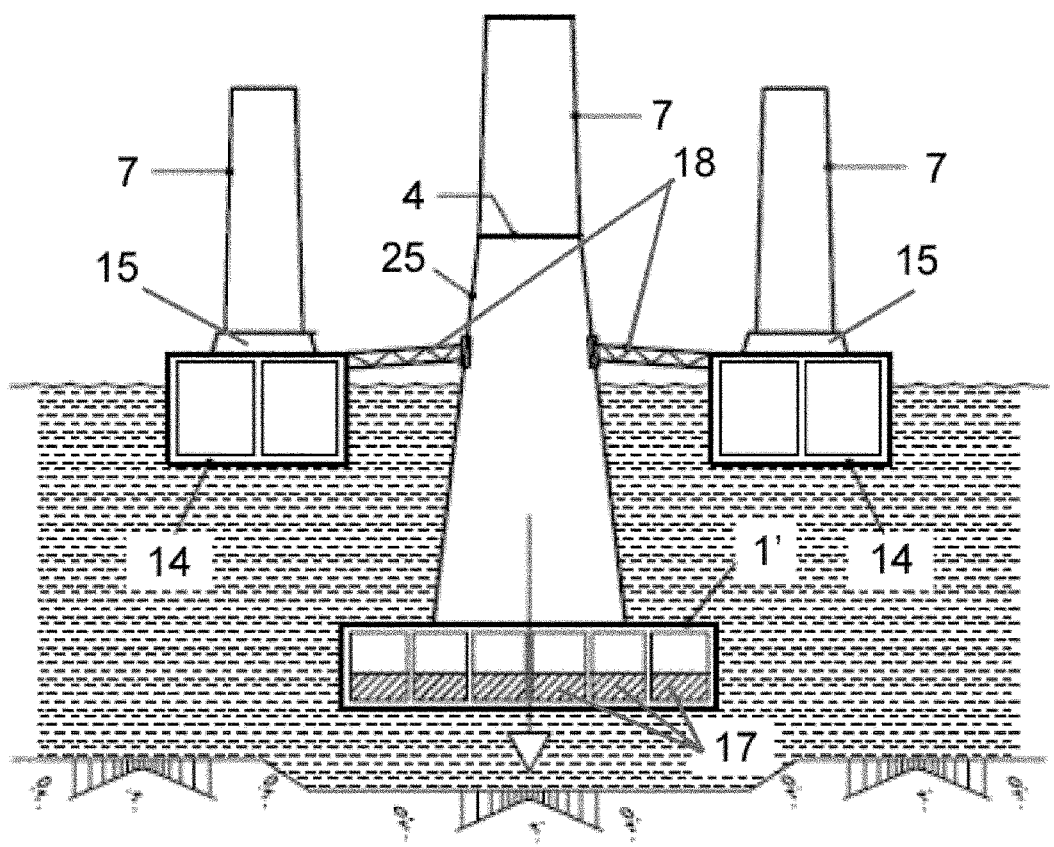
FIG. 10 shows a schematic sectional front view corresponding to FIG. 8 but at a later stage of an installation process according to the present invention.
Figure 11:
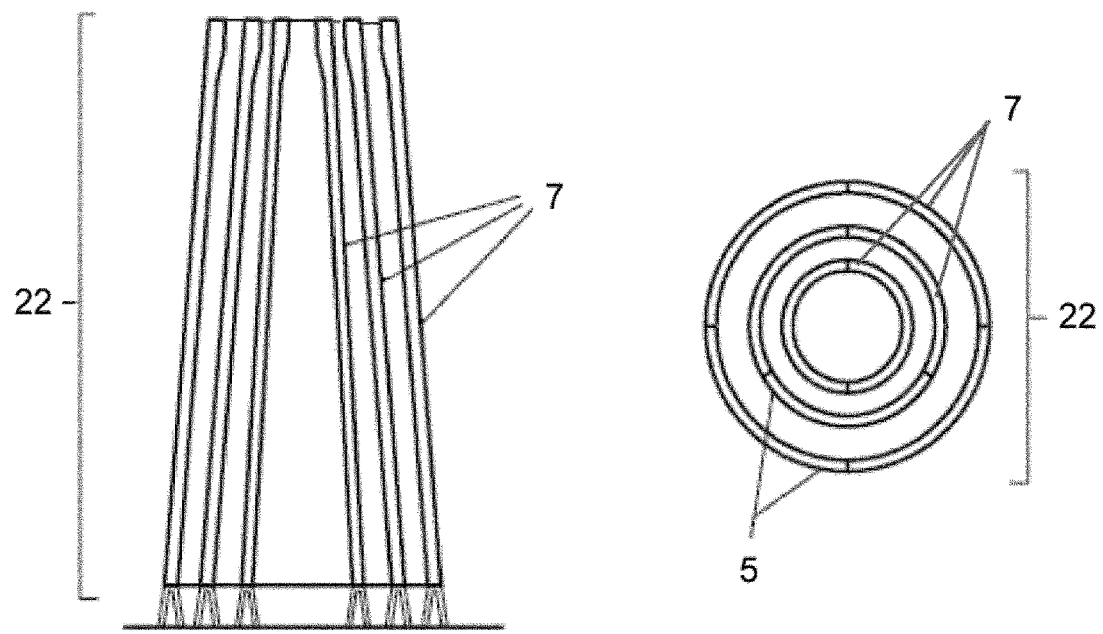
FIG. 11 shows a schematic elevational view and top plan view, both in cross-section, of a detail of the assembly of FIGS. 7 to 10, specifically the configuration of superposition sections supported by an auxiliary floatability structure of the assembly of FIGS. 7 to 10, configuration wherein said superposition sections are arranged with a multi-layered configuration.
Figure 13:
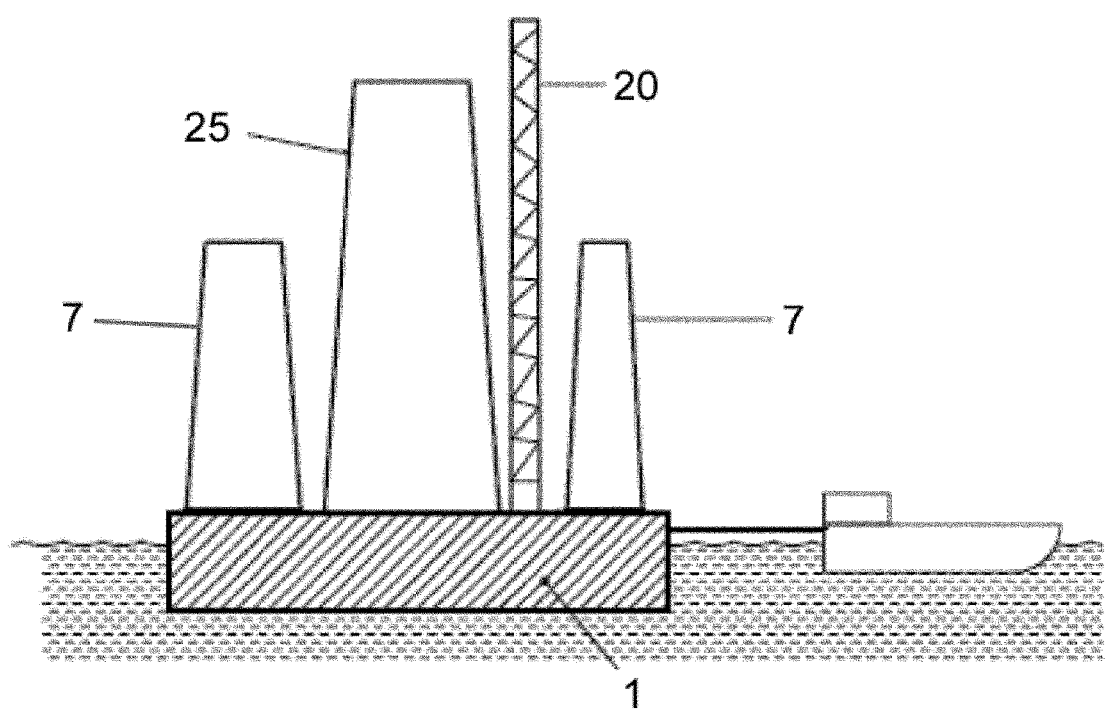
FIG. 13 shows a schematic front view of a third starting unit which is being towed, with superposition sections and means for assembling towers thereupon.
Figure 14:
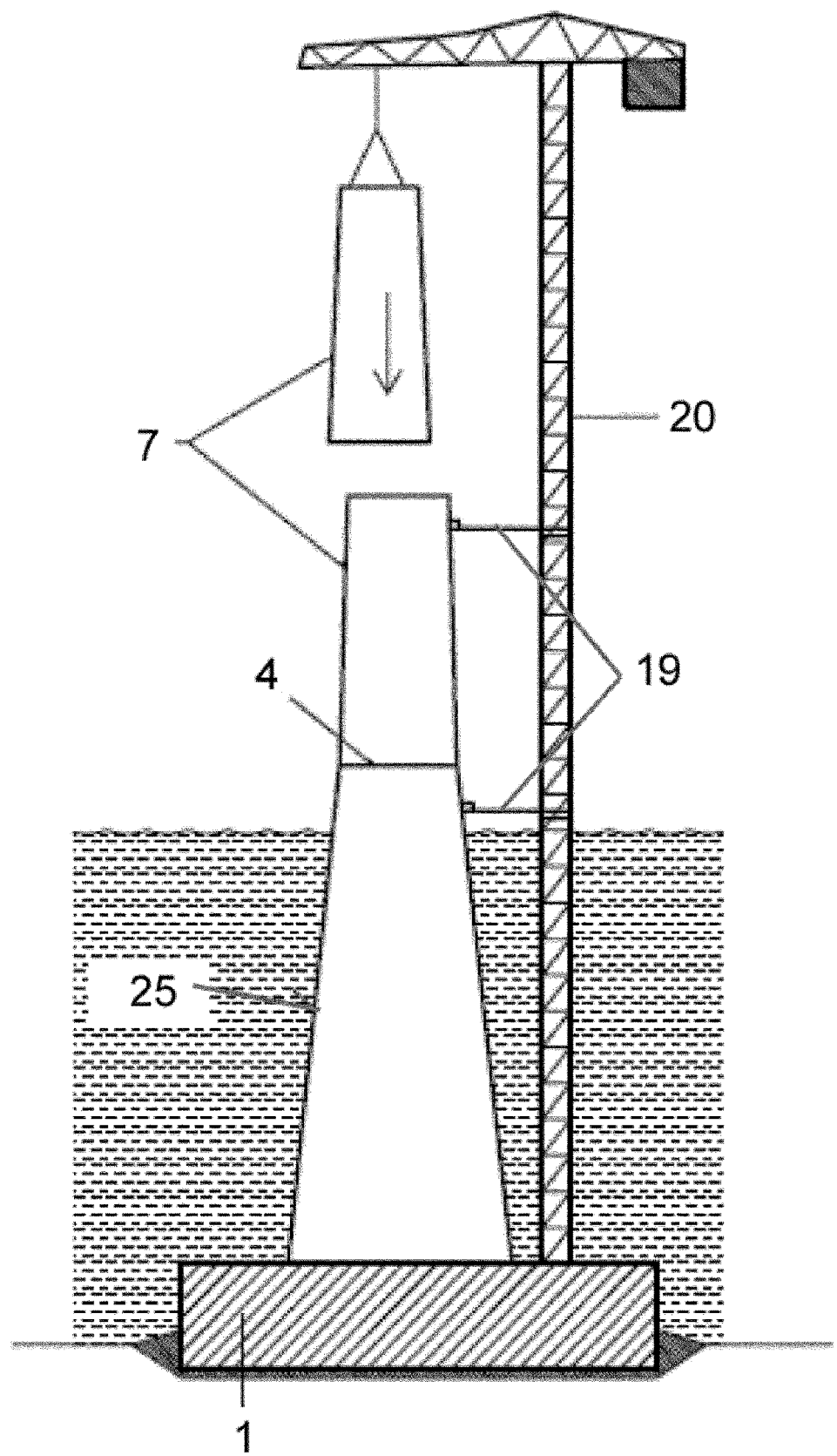
FIG. 14 shows a schematic front view corresponding to FIG. 13 but at a later stage of an installation process according to the present invention.

As shown particularly in FIG. 11, although also included in FIG. 7, in order to transport the superposition sections 7 at least part of said superposition sections 7 can be arranged in a temporary multi-layered configuration 22, such that said superposition sections 7 are essentially arranged on the same axis and level, with the smaller sections inside the larger sections. This allows greater efficiency of the space occupied and can facilitate the assembly operation of the sections, given that it allows successive raising of the superposition sections without obstacles, whereupon the superposition section having the largest diameter and being most outwardly arranged is raised from its temporary position in each case, by external lifting means such as, for example, crane 20 as shown in FIGS. 13-14.

Figure 17:
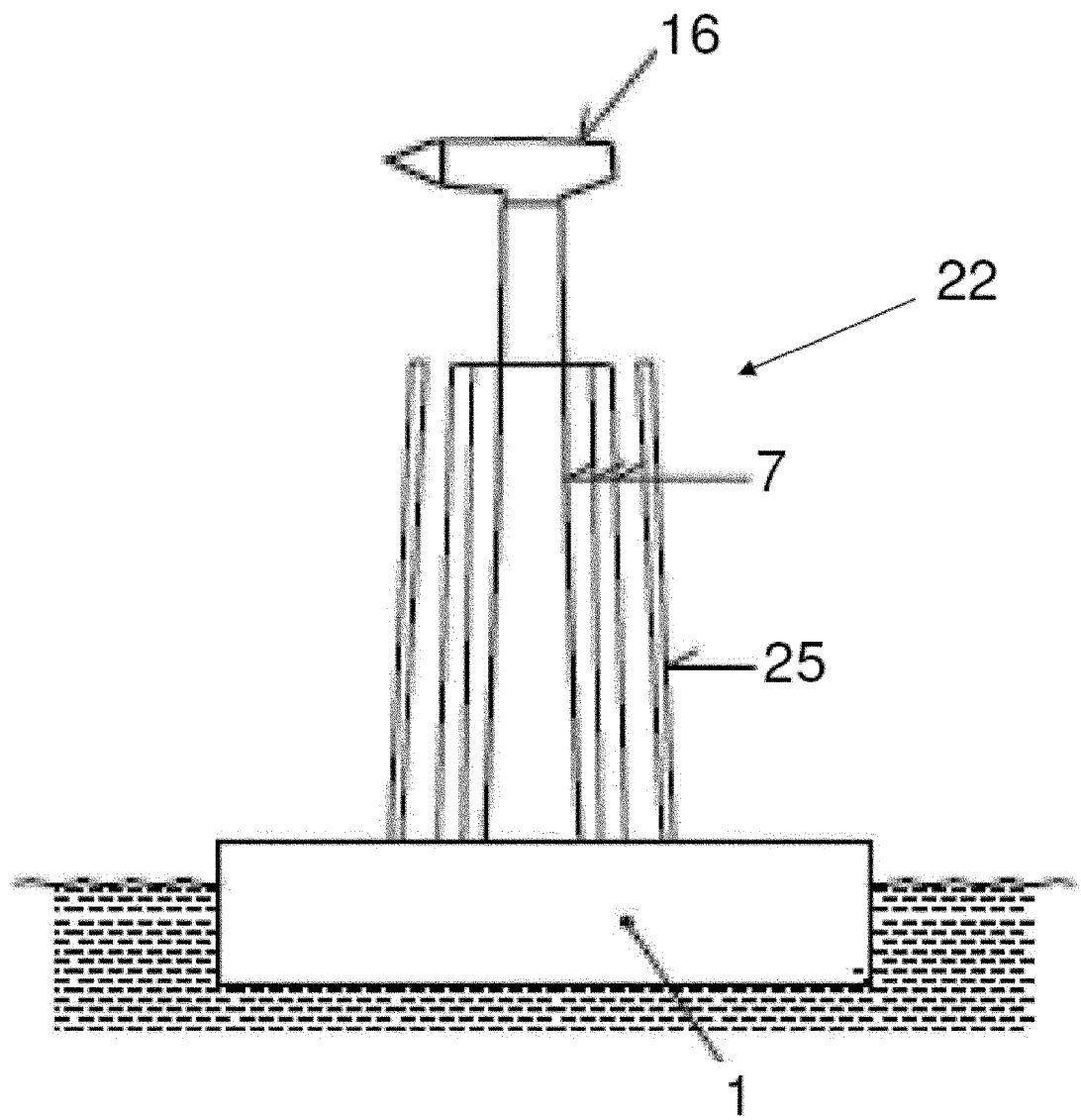
FIG. 17 shows a schematic front view, in partial cross-section, of the starting unit of FIG. 2 including the base section and the superposition sections arranged with a multi-layered configuration thereupon.
Figure 18:
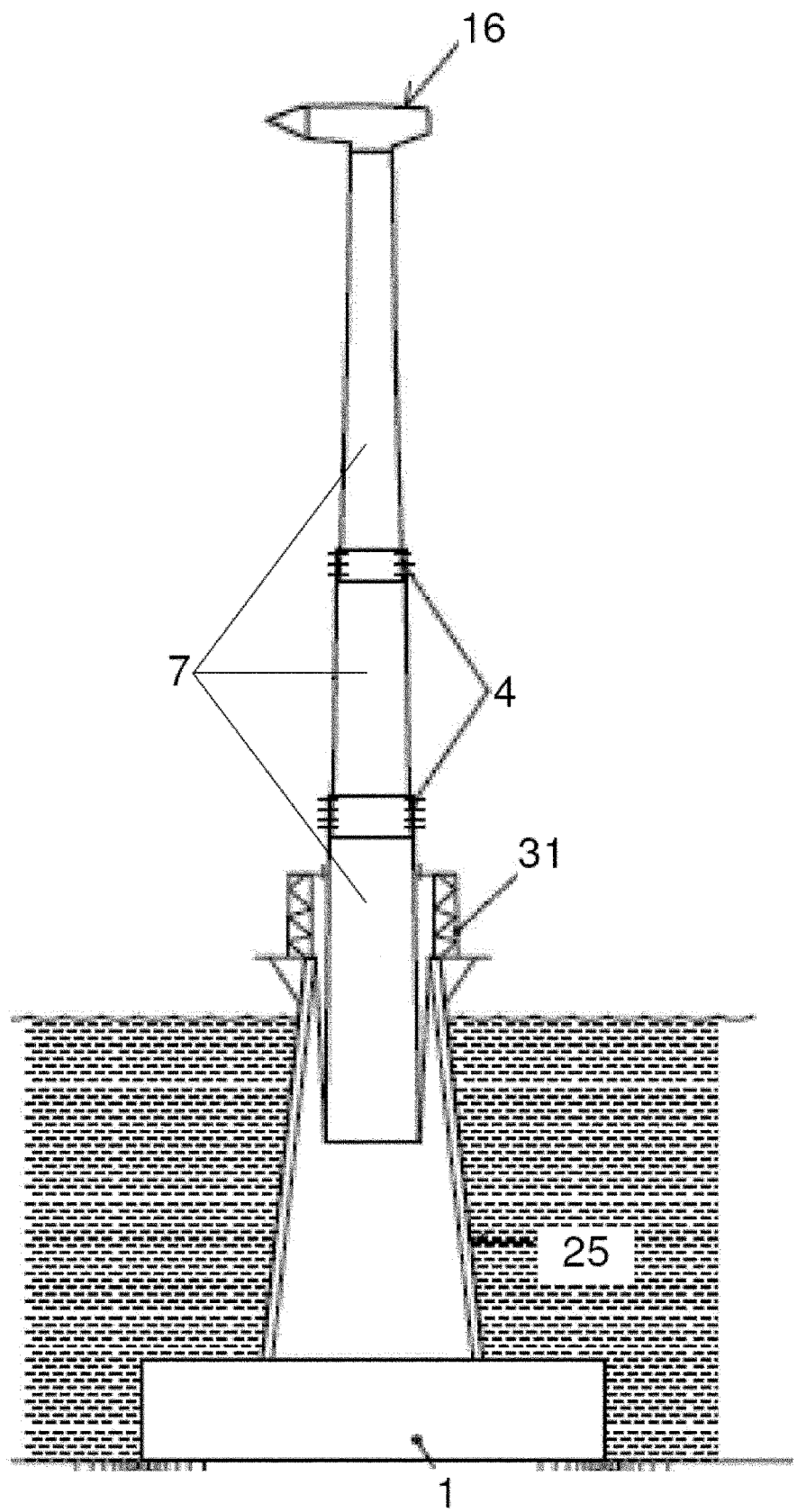
FIG. 18 shows a schematic front view, in partial cross-section, corresponding to FIG. 17 but at a later stage of an installation process according to the present invention.

Referring now to FIGS. 17 and 18, base section 25 and superposition sections 7 are arranged with a multi-layered configuration, and said starting unit 1, 1', 25 therefore includes said multi-layered configuration. In this case, external lifting means (similar to crane 20 as shown in FIGS. 13-14) can be used to pull the superposition sections up from their position and expand them into the shaft in a telescopic manner. However, it is preferred for said base section and said superposition sections with a multi-layered configuration to comprise self-lifting means to expand the shaft also in a telescopic manner, as known in the art (see for example GB 2451191 A, WO 02/46552 A1 and WO 2011/006526 A1), in order to overcome or at least reduce the need for external lifting means which as already mentioned are usually very costly and hardly available.

Particularly in FIG. 17, wind turbine means have been applied for transportation on the top section in the mutually definitive position. In this case, said wind turbine means include for transportation the nacelle and the functional fittings thereof only. However, as mentioned above, said wind turbine means can include, for transportation, even the corresponding blades. In the latter case, the top section can be lifted prior to or during sinking of the starting unit in order to try to avoid contact between said blades and the body of water wherein the installation point of said substructure is located.

If the base section free end (opposite the base section end applied to the foundation block) is intended to remain above water level once the starting unit is in installed condition, an scaffolding 31 can be attached to the shaft essentially on the same level than the base section free end, suitable to safely support at least one operator, mainly for assembling operations, as shown in particular in FIG. 18. In this case, it is preferred if all superposition sections or all superposition sections but the top section are substantially the same length and the shaft is expanded in a telescopic manner by successively pulling up one superposition section at a time starting from the innermost superposition section, so that the section assembling operations are always carried out at said scaffolding level.

Figure 12:
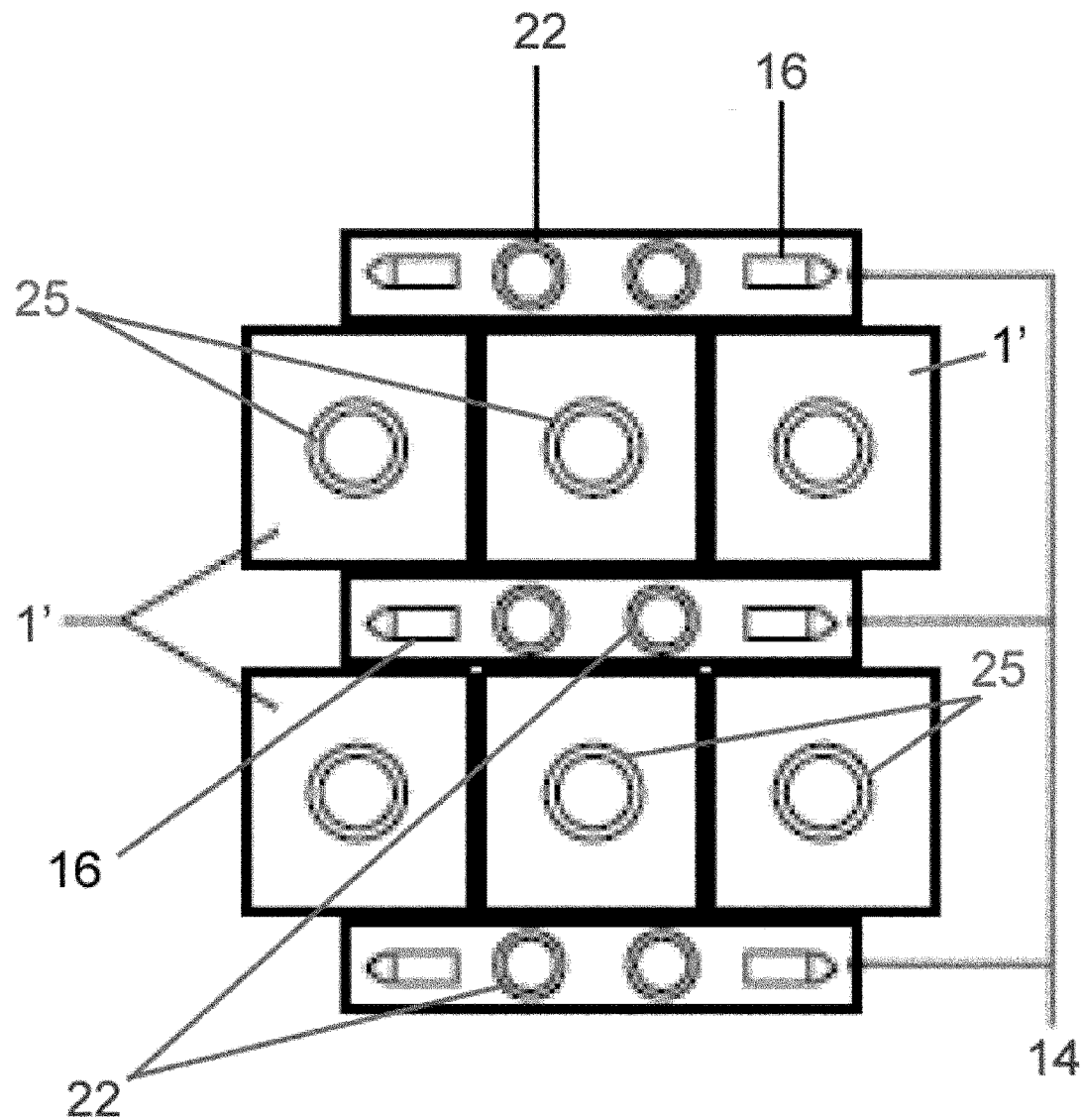
FIG. 12 shows a schematic top plan view of an assembly of starting units having common auxiliary floatability structures.

As shown in FIG. 12, assemblies formed by several starting units 1', 25 and auxiliary floating structures 14 common to some of said starting units 1', 25 can also be formed for transport operations by floatation. This solution allows a reduction in the number of auxiliary structures required, which can be particularly advantageous if the distance from the manufacturing point of said starting unit to the installation point of the corresponding tower is significantly high. A plurality of starting units can also be united for transportation without any auxiliary floating structure at all.

As now shown in FIGS. 13-14, a crane 20 can be arranged on the platform 1, possibly provisional and reusable, for assembling the substructure 1, 1', 7, 25, and optionally the wind turbine means 16 or any of its constituent parts. In this case, at least part of the crane 20 mast, for example the metal jacket, can be transported already installed on the platform 1 and remain partially submerged after sinking. By way of example, as shown specifically in FIG. 14, the crane 20 is secured using means for fastening 19 to sections of the tower itself, and the crane 20 parts are provisional and reusable with the exception of a semi-submerged lower part, which is permanent for the purpose of facilitating reinstallation of the crane for maintenance, repair or component replacement operations, etc.

Said crane can be self-mountable, i.e. the tower can be a crane-tower, already known in other applications.

Figure 15:
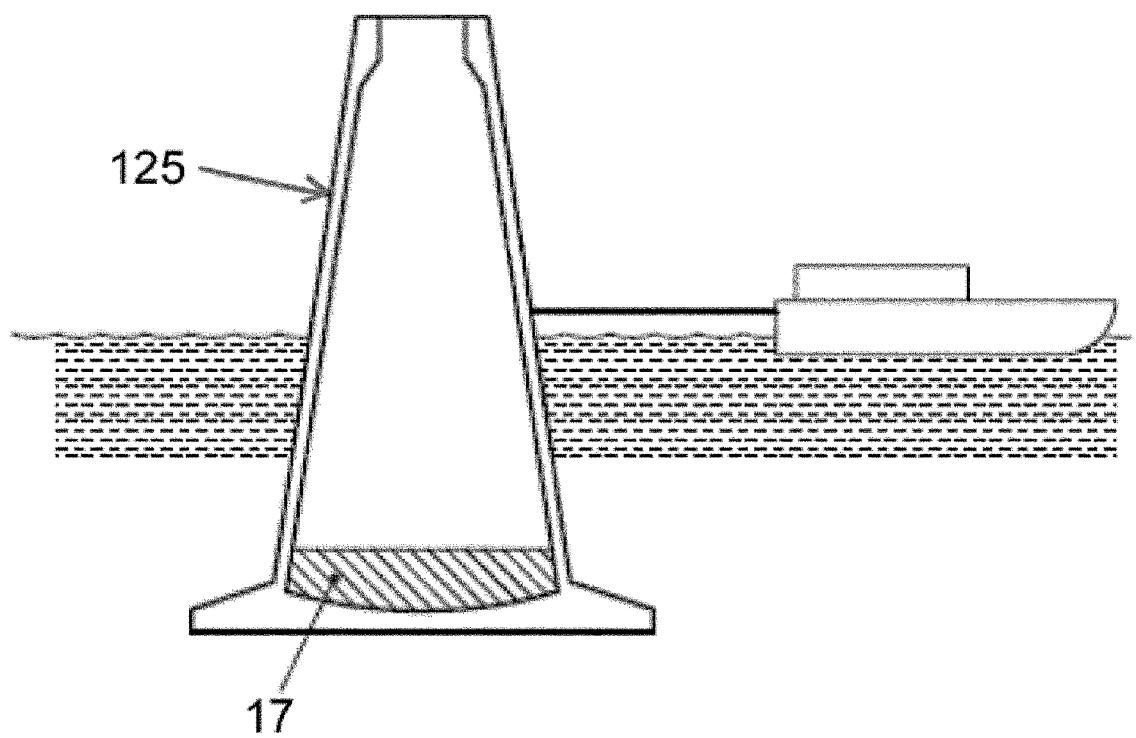
FIG. 15 shows a schematic sectional front view of a fourth starting unit which is being towed.
Figure 16:
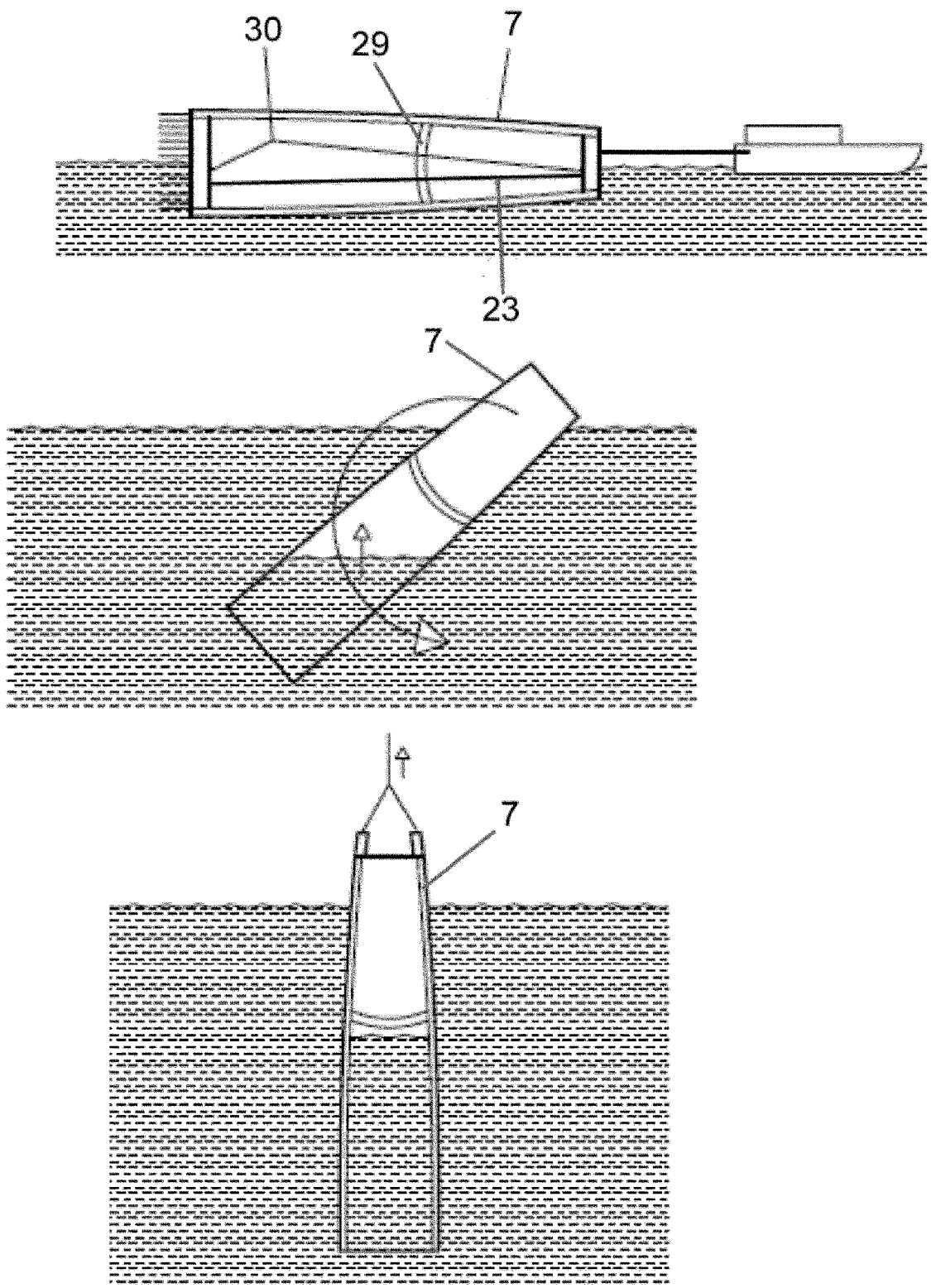
FIG. 16 shows a schematic view of a superposition section transported independently to the starting unit, in three different stages of the installation process according to the present invention.

Finally, for illustrative purposes only, FIG. 15 shows a starting unit 125 wherein the platform and base section form a single unit, and FIG. 16 shows a superposition section 7 at three different stages of the installation process according to the present invention. Said superposition section 7 is adapted by means of internal partitioning (in this case by means of a fixed watertight radial wall 29 and two detachable watertight radial walls 30 secured by a strut 23, also detachable) for self-floatation and self-overturning and is transported independently to the corresponding starting unit.

Naturally, the principle of the invention remaining the same, the embodiments and construction details can widely vary with regard to those described and illustrated herein purely by way of non-limiting example, without departing from the scope of protection of the invention, as defined in the following claims.

Specifically, by way of illustrative and non-limiting example, while the tower shaft has a circular cross-section in a preferred option of application, alternative polygonal cross-section geometries are also possible.

The invention claimed is:

1. A process for installing an offshore tower, particularly a substructure which includes a tower shaft made from concrete, reinforced concrete, metal or a concrete/metal combination, of the semi-submerged type in an installed condition, and a corresponding tower foundation made from concrete, wherein:
said the tower shaft comprises at least three sections, that is a base section and at least two expandable superposition sections;
said tower shaft is telescopic;
said tower shaft is semi-submerged in the installed condition and said foundation is submerged in the installed condition;
said process comprises the following steps, in chronological order:
a) dry manufacturing a foundation comprising a foundation block that comprises concrete, said foundation block being essentially hollow and watertight and having ballast valve means for opening a passage to the interior of said foundation block, dry manufacturing at least one superposition section of said tower shaft, and dry manufacturing a base section of said tower shaft;
b) applying, mechanically or integrally, said base section to said foundation block in such a manner that said base section and said foundation block assume the relative position envisaged for the installed condition, said base section and said foundation block forming a starting unit, applying all the superposition sections of said tower shaft to said starting unit so that said base section and said superposition sections are in a multi-layered configuration, and applying self-lifting means to at least one of said foundation block and said base section;
c) moving said starting unit, in a self-floating manner, through the body of water wherein the installation point of said substructure is located, up to the installation point of said substructure;
d) actuating, in a controlled manner, said ballast valve means of said foundation block so as to open said passage to the interior of said foundation block and introduce ballast in said foundation block through said passage in such a manner that said starting unit sinks until resting on the bottom of the body of water; and
e) actuating said self-lifting means in order to expand the superposition sections in a telescopic manner by successively pulling one superposition section at a time starting from the innermost superposition section into the installed condition of said tower shaft;
said process also comprises after step a) and before step c), the following step:
f) placing said foundation block or starting unit in the body of water wherein the installation point of said substructure is located;

characterized in that:
in step d), sinking is assisted by an auxiliary self-buoyant structure comprising guiding means linked to said base section, wherein said guiding means are joined in a fixed manner to said auxiliary self-buoyant structure and in a sliding manner to said base section, so that said auxiliary self-buoyant structure and guiding means do not contribute to the floatability of said base section during step d), and wherein said auxiliary self-buoyant structure remains only partially submerged during the sinking process.

2. The process for installing an offshore tower according to claim 1, wherein said superposition sections are formed from voussoirs, and the dry manufacturing of said superposition sections includes the pre-assembly of said voussoirs until forming complete sections.

3. The process for installing an offshore tower according to claim 1, wherein said process also comprises after step a) and before step c), the following step:
g) applying wind turbine means to at least one of said foundation block, said base section and said superposition sections.

4. The process for installing an offshore tower according to claim 3, wherein in step g), said wind turbine means are applied directly on a superposition section intended to be a top section.

5. The process for installing an offshore tower according to claim 4, wherein in step g), said wind turbine means are applied directly on said superposition section intended to be the top section including at least one blade.

6. The process for installing an offshore tower according to claim 5, wherein the top section is lifted prior to or during step d).

7. The process for installing an offshore tower according to claim 1, wherein the step a) comprises the dry manufacturing of the at least two superposition sections of said tower shaft and wherein the base section free end, opposite the base section end applied to the foundation block, remains above water level once the starting unit is in the installed condition, and wherein, all superposition sections or all superposition sections but atop section are substantially the same length;
characterized in that:
a scaffolding is attached in direct contact to said tower shaft essentially on the same level as the base section free end so as to have the tower shaft expanded in a telescopic manner by successively pulling up one superposition section at a time starting from the innermost superposition section, so that section pulling and expansion operations are always carried out at the level of the base section free end.

8. The process for installing an offshore tower according to claim 7, wherein said superposition sections are formed from voussoirs, and the dry manufacturing of said superposition sections includes the pre-assembly of said voussoirs until forming complete sections.

9. A process for installing an offshore tower, particularly a substructure which includes a tower shaft made from concrete, reinforced concrete, metal or a concrete/metal combination, of the semi-submerged type in an installed condition, and a corresponding tower foundation made from concrete, wherein:
said tower shaft comprises at least three sections, that is a base section and at least two expandable superposition sections;
said tower shaft is telescopic;

said tower shaft is semi-submerged in the installed condition and said foundation is submerged in the installed condition;

said process comprises the following steps, in chronological order:

a) dry manufacturing a foundation comprising a foundation block that comprises concrete, said foundation block being essentially hollow and watertight and having ballast valve means for opening a passage to the interior of said foundation block, dry manufacturing at least one superposition section of said tower shaft, and dry manufacturing a base section of said tower shaft;

b) applying, mechanically or integrally, said base section to said foundation block in such a manner that said base section and said foundation block assume the relative position envisaged for the installed condition, said base section and said foundation block forming a starting unit, applying all the superposition section(s) of said tower shaft to said starting unit so that said base section and said superposition section(s) are in a multi-layered configuration, and applying self-lifting means to at least one of said foundation block and said base section;

c) moving, said starting unit, in a self-floating manner, through the body of water wherein the installation point of said substructure is located, up to the installation point of said substructure;

d) actuating in a controlled manner, said ballast valve means of said foundation block so as to open said passage to the interior of said foundation block and introduce ballast in said foundation block through said passage in such a manner that said starting unit sinks until resting on the bottom of the body of water; and e) actuating said self-lifting means in order to expand in a telescopic manner said superposition section(s) into the installed condition of said tower shaft;

said process also comprises after step a) and before step c) the following step:

f) placing said foundation block or starting unit in the body of water wherein the installation point of said substructure is located, wherein the top section is lifted prior to or during step d).

10. A process for installing an offshore tower, particularly a substructure which includes a tower shaft made from concrete, reinforced concrete, metal or a concrete/metal combination, of the semi-submerged type in an installed condition, and a corresponding to foundation made from concrete, wherein:

said the tower shaft comprises at least three sections, that s a base section and at least two expandable superposition sections;

said tower shaft is telescopic;

said tower shaft is semi-submerged in the installed condition and said foundation is submerged in the installed condition;

said process comprises the following steps, in chronological order:

a) dry manufacturing a foundation comprising a foundation block that comprises concrete, said foundation block being essentially hollow and watertight and having ballast valve means for opening a passage to the interior of said foundation block, dry manufacturing at least one superposition section of said tower shaft, and dry manufacturing a base section of said tower shaft;

b) applying, mechanically or integrally, said base section to said foundation block in such a manner that said base section and said foundation block assume the relative position envisaged for the installed condition, said base section and said foundation block forming a starting unit, applying all the superposition sections of said tower shaft to said starting unit so that said base section and said superposition sections are in a multi-layered configuration, and applying self-lifting means to at least one of said foundation block and said base section;

c) moving said starting unit, in a self-floating manner, through the body of water wherein the installation point of said substructure is located, up to the installation point of said substructure;

d) actuating, in a controlled manner, said ballast valve means of said foundation block so as to open said passage to the interior of said foundation block and introduce ballast in said foundation block through said passage in such a manner that said starting unit sinks until resting on the bottom of the body of water; and e) actuating aid self-lifting means in order to expand the superposition sections in a telescopic manner by successively pulling one superposition section at a time starting from the innermost superposition section into the installed condition of said tower shaft;

said process also comprises after step a) and before step c), the following step:

f) placing said foundation block or starting unit in the body of water wherein the installation point of said substructure is located, wherein the step a) comprises the dry manufacturing of the at least two superposition sections of said tower shaft and wherein the base section free end, opposite the base section end applied to the foundation block, remains above water level once the starting unit is in the installed condition, and wherein, all superposition sections or all superposition sections but a top section are substantially the same length;

characterized in that:

a scaffolding is attached in direct contact to said tower shaft essentially on the same level as the base section free end so as to have the tower shaft expanded in a telescopic manner by successively pulling up one superposition section at a time starting from the innermost superposition section, so that section pulling and expansion operations are always carried out at the level of the base section free end.

* * * * *